US012792123B2

(12) United States Patent
Wilde et al.

(10) Patent No.: US 12,792,123 B2
(45) Date of Patent: Nov. 10, 2026

(54) OPTIMIZING ENERGY EFFICIENCY OF SERVER LOAD BASED ON POWER MEASUREMENTS AND CHARACTERISTICS

(71) Applicant: Hewlett Packard Enterprise Development LP, Spring, TX (US)

(72) Inventors: Torsten Wilde, Berlin (DE); Bradley Eugene Mayes, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 79 days.

(21) Appl. No.: 18/787,298

(22) Filed: Jul. 29, 2024

(65) Prior Publication Data

US 2026/0029832 A1 Jan. 29, 2026

(51) Int. Cl.
*G06F 1/3206* (2019.01)
*G06F 1/3234* (2019.01)

(52) U.S. Cl.
CPC .......... *G06F 1/3206* (2013.01); *G06F 1/3234* (2013.01)

(58) Field of Classification Search
None
See application file for complete search history.

(56) References Cited

U.S. PATENT DOCUMENTS

2013/0325378 A1* 12/2013 Allen-Ware ............ G06F 1/329 702/61
2017/0185132 A1* 6/2017 Bodas ................. G06F 11/3062
2017/0322241 A1* 11/2017 Tang ...................... G06N 20/00
2020/0118039 A1* 4/2020 Kocberber ........... G06N 3/0442
2020/0134423 A1* 4/2020 Shinde ................ G06F 11/3495
2021/0342185 A1* 11/2021 Naidu ................... G06F 1/3206
(Continued)

OTHER PUBLICATIONS

"Flexible workload generation for HPC cluster efficiency benchmarking"; Daniel Molka • Daniel Hackenberg • Robert Schöne • Timo Minartz • Wolfgang E. Nagel; SICS; Springer-Verlag 2011 (Year: 2011).*

(Continued)

*Primary Examiner* — Michael Alsip
(74) *Attorney, Agent, or Firm* — Yao Legal Services, Inc.

(57) ABSTRACT

A system determines a plurality of benchmark workloads including a compute-heavy workload, a memory-heavy workload, and an input/output (I/O)-heavy workload. The system obtains, for a respective benchmark workload, a benchmark power measurement associated with a benchmark system. The benchmark power measurement indicates a target efficiency threshold for the respective benchmark workload. The system measures power characteristics for a current workload on a computing device. The power characteristics comprise current power measurements associated with the computing device, processing components of the computing device, memory components of the computing device, and I/O components of the computing device. The system identifies, based on a ratio between two of the power characteristics, a benchmark workload most closely associated with the current workload. The system optimizes operation of the computing device by adjusting the current workload until an overall power consumption of the computing device reaches the target efficiency threshold for the identified benchmark workload.

20 Claims, 9 Drawing Sheets

(56) References Cited

U.S. PATENT DOCUMENTS

| | | | | |
|---|---|---|---|---|
| 2022/0113784 A1* | 4/2022 | Alben | ..................... | G06F 1/206 |
| 2025/0093393 A1* | 3/2025 | Chaudhari | .............. | G06F 11/34 |

OTHER PUBLICATIONS

"Measuring and Analyzing Energy Consumption of the Data Center"; Theodosios Makris; Aalto University School of Electrical Engineering; Jul. 15, 2017 (Year: 2017).*

Dell, "Support for Dell OpenManage Enterprise Power Manager", available online at <https://www.dell.com/support/kbdoc/en-in/article/lkbprint?ArticleNumber=000176254&AccessLevel=10&Lang=en>, 2024, 9 pages.

Standard Performance Evaluation Corporation, "SPECpower_ssj2008", available online at <https://www.spec.org/power_ssj2008/results/res2023q3/power_ssj2008-20230524-01270.html>, 2023, 5 pages.

TOP500.org, "HPCG", available online at <https://www.top500.org/lists/hpcg/>, 2024, 2 pages.

* cited by examiner

OPTIMIZING ENERGY EFFICIENCY OF SERVER LOAD BASED ON POWER MEASUREMENTS AND CHARACTERISTICS

BACKGROUND

Field

Data centers continue to grow in size and number. Improving economic operations and addressing regulatory oversight are challenges which can be addressed by reducing carbon footprint and increasing energy efficiency. A key metric in measuring energy efficiency is work per watt (WPW), i.e., performance divided by power consumption. A High Performance Computing (HPC) environment can include single-user-node allocation and bulk, synchronous parallel application-type workloads, for which performance and power measurements may be obtained using standard tools. In contrast, an enterprise environment can be a shared resource environment in which each virtual machine (VM) may include workloads unrelated to other VMs on the same device. As a result of this separation of execution spaces, it can be challenging to determine performance and power measurements for every single workload in an enterprise environment.

BRIEF DESCRIPTION OF THE FIGURES

In the figures, like reference numerals refer to the same figure elements.

DETAILED DESCRIPTION

Figure 1A:
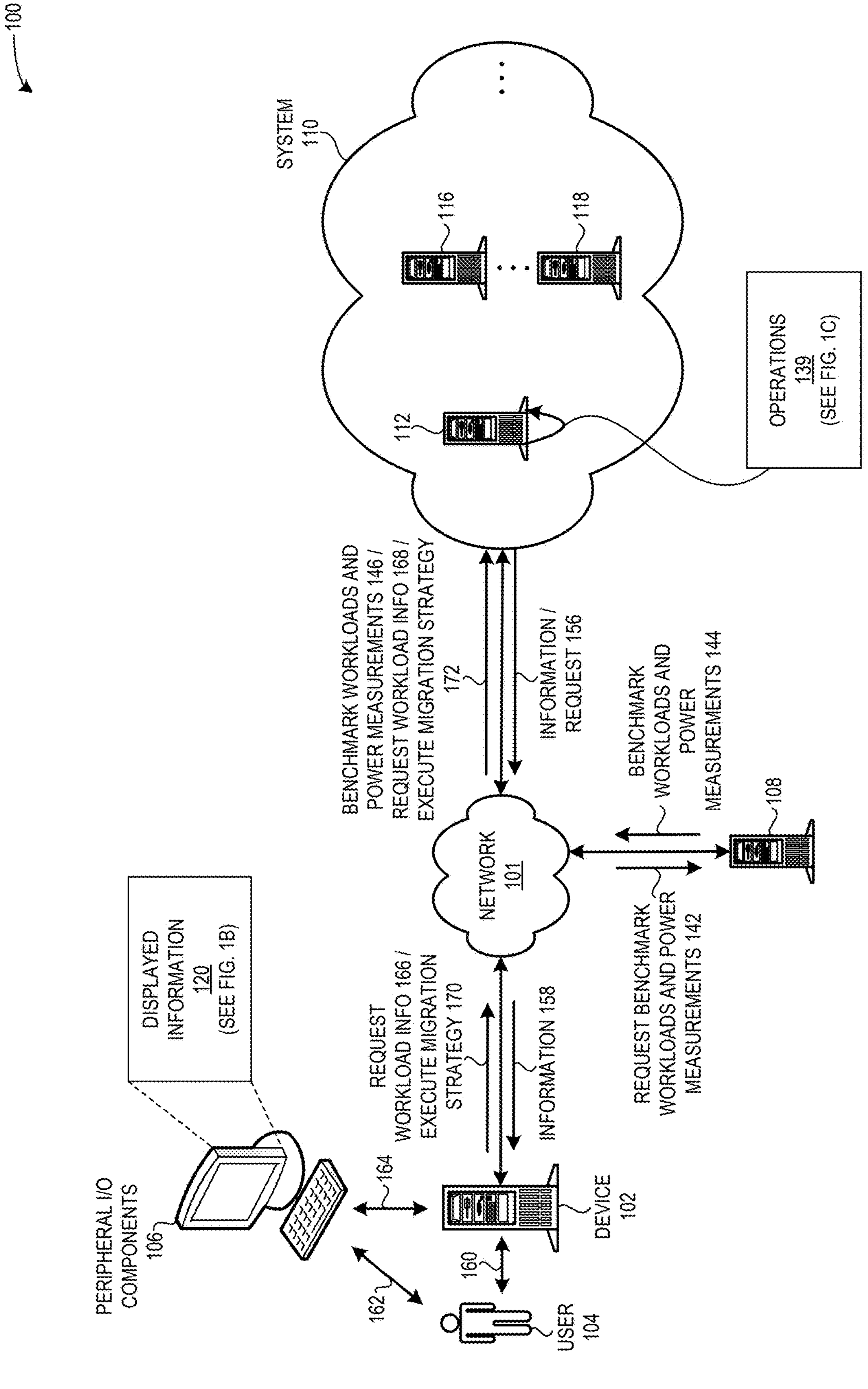
FIG. 1A illustrates an environment which facilitates optimizing energy efficiency of server load based on power measurements and characteristics, in accordance with an aspect of the present application.

Aspects of the instant application address limitations of optimizing energy efficiency (e.g., in enterprise environments) by measuring, for a given workload, power consumption of a server and three sub-systems of the server (processing components, memory components, and input/output (I/O) components) and executing job migration based on a comparison of the server power measurements for the given workload to measurements of a benchmark workload.

The unbounded need for compute and memory resources can result in increasingly higher amounts of power required by data centers or in HPC systems. The need to both improve economic operations and address stricter regulatory requirements may require optimization of energy efficiency in data centers and HPC systems. In HPC systems, which include single-user-node allocation and bulk, synchronous parallel application-type workloads, certain performance and power measurements may be obtained. In contrast, an enterprise environment can be a shared resource environment in which each virtual machine (VM) may include workloads unrelated to other VMs on the same device. As a result of this separation of execution spaces, it can be challenging to determine performance and power measurements for every single workload in an enterprise environment.

The described aspects address these limitations by providing a system which can optimize a server load for energy efficiency (e.g., in an enterprise environment). A key metric in measuring energy efficiency is work per watt (WPW), i.e., performance divided by power consumption. The described system can provide a hardware-based dynamic server load adjustment by determining three benchmark workloads (i.e., a compute-heavy workload, a memory-heavy workload, and an I/O-heavy workload) and an optimal efficiency for the benchmark workloads (e.g., based on WPW). Each of the three benchmark workloads may be associated with a "target efficiency threshold," i.e., an amount of power draw at which the WPW metric is the highest or at which a different metric such as performance is the greatest. In addition, each benchmark workload can include measured power characteristics of the benchmark system itself and of three hardware-related sub-systems of the benchmark system, e.g.: 1) the benchmark system; 2) processing components of the benchmark system; 3) memory components of the benchmark system; and 4) I/O components of the benchmark system.

Subsequently, for a current workload on a server, the system can measure the same power characteristics as measured for the benchmark workload, e.g.: 1) the server; 2) processing components of the server; 3) memory components of the server; and 4) I/O components of the server. Based on these hardware-related power characteristics, the system can identify one of the benchmark workloads to which the current workload is most closely associated. Identifying the most closely associated workload is described below in relation to FIGS. 1A, 1B, 1C, and 4. As a result, the system can optimize operation of the server based on the optimal efficiency for the identified benchmark workload, e.g., by migrating more jobs, VMs, or container applications to the server until the optimal efficiency has been reached.

Thus, the described aspects can optimize the energy efficiency (i.e., performance over power consumption or "work per watt" (WPW)) by measuring the overall power consumption of the server as well as the power consumption of the server sub-systems (i.e., processing components, memory components, and I/O components). This can result in reducing both the overall energy consumption of the server (and correspondingly, of a data center or an HPC environment in which the server operates) and the carbon footprint of the server.

Many existing solutions relating to energy optimization may require a tight integration with the software stack and thus may only work with a specific software technology. Unlike current solutions, the system does not rely on integration with software in order to provide the described improvement. Because the described aspects can be performed without collecting any specific workload information during runtime, the described system can be agnostic to any specific software technology. By remaining software implementation-agnostic, the described aspects can provide a flexible and efficient manner of optimizing energy efficiency of a server load.

Figure 1B:
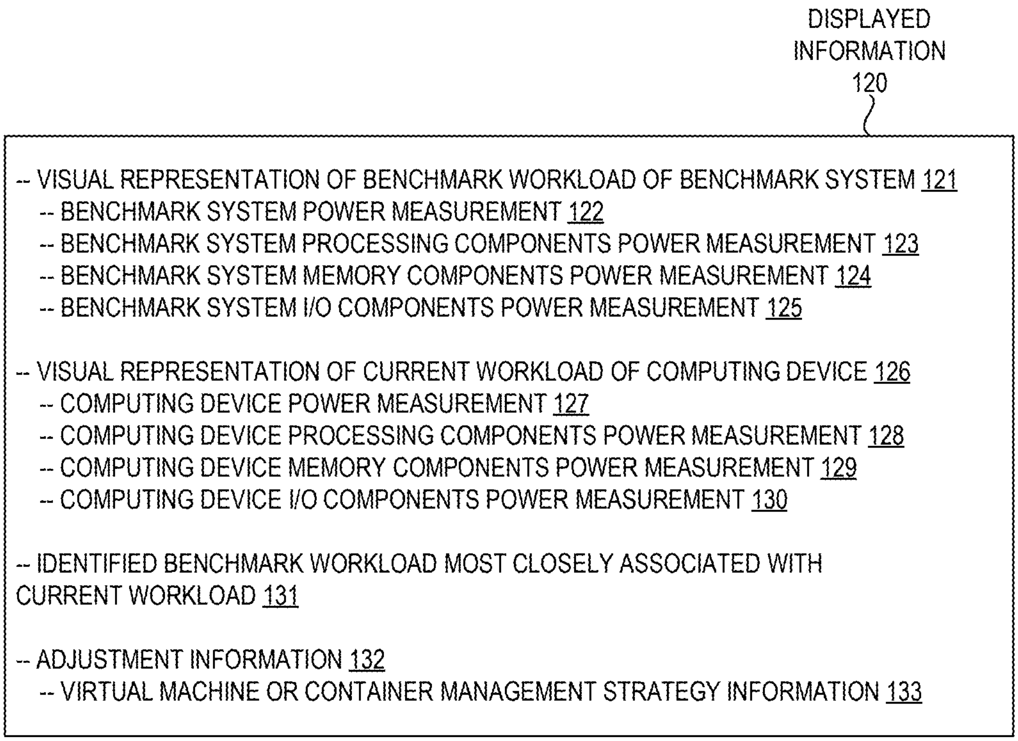
FIG. 1B illustrates information displayed on a component of the environment of FIG. 1A, in accordance with an aspect of the present application.
Figure 1C:
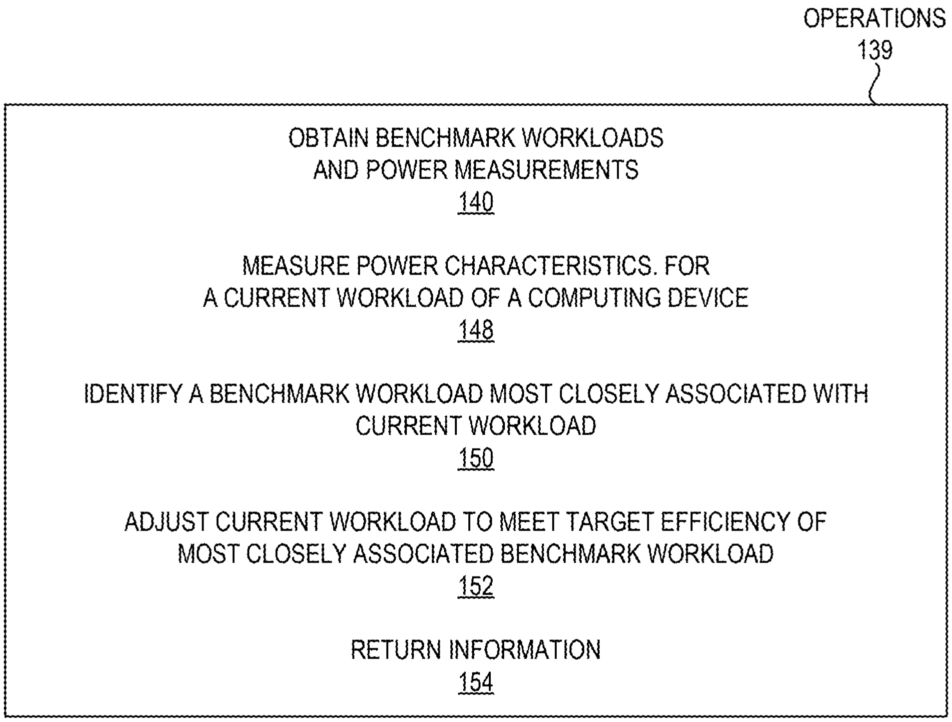
FIG. 1C illustrates operations performed by a component of the environment of FIG. 1A, in accordance with an aspect of the present application.

FIG. 1A illustrates an environment 100 which facilitates optimizing energy efficiency of server load based on power measurements and characteristics, in accordance with an aspect of the present application. FIG. 1B illustrates information 120 displayed on a component of the environment of FIG. 1A, in accordance with an aspect of the present application. FIG. 1C illustrates operations 139 performed by a component of the environment of FIG. 1A, in accordance with an aspect of the present application. Environment 100 may include a device 102, a server or system 108, and a system 110 which communicate over a network 101. Device 102 can be associated with a user 104 and peripheral I/O components 106. Device 102 can receive commands from user 104 and display information on or receive data from peripheral I/O components 106 via, respectively, communications 160 and 164. User 104 can communicate with or send commands to device 102 using peripheral I/O components 106 via communications 160 and 162. Various elements or information (e.g., displayed information 120 of FIG. 1B) can be displayed (or entered or manipulated) using peripheral I/O components 106. Server 108 can include one or more computing devices and can store, retrieve, access, or generate information associated with benchmark workloads. System 110 can be an HPC system or a container environment which includes a plurality of nodes or servers, e.g., 112, 116, and 118. The plurality of nodes in HPC system or container environment 110 can be running a plurality of jobs, and one or more jobs may be referred to as a workload. A workload can also be associated with jobs based on specific applications running on a client device (not shown) or based on container applications running in system 110.

During operation, server 112 can perform operations 139 (as depicted in FIG. 1C). Server 112 can obtain benchmark workloads and associated power measurements for each benchmark workload (operation 140), e.g., by sending a request 156 to server 108. In response to receiving request 156 (as a request benchmark workloads and power measurements 142), server 108 can return benchmark workloads and power measurements 144. The benchmark workloads returned by server 108 can be, e.g., an industry-standard benchmark or training workload, a workload provided by a customer or user associated with server 112 or another computing device, or a workload comprising a combination of compute-related jobs, memory-related jobs, and I/O-related jobs. Server 108 may store the benchmark workloads and power measurements or may be an access point which can retrieve benchmark workloads and power measurements from other sources (not shown). Server 112 can receive benchmark workloads and power measurements 144 (as benchmark workloads and power measurements 146). As described above, the benchmark power measurements can be measured power characteristics of the benchmark system itself and of three sub-systems of the benchmark system, e.g.: 1) the benchmark system; 2) processing components of the benchmark system; 3) memory components of the benchmark system; and 4) I/O components of the benchmark system. Server 112 can include thresholds for when a sub-system power measurement (processing components, memory components, or I/O components) compared to the overall power consumption (of the benchmark system) defines whether a benchmark workload is categorized as a compute-heavy workload, a memory-heavy workload, or an I/O heavy workload. That is, the second, third, and fourth benchmark power measurements (i.e., associated with, respectively, the compute-heavy workload, the memory-heavy workload, and the I/O heavy workload) can be defined or determined to be associated with the respective benchmark workload based on the respective power measurement being greater than a predetermined percentage of the overall power consumption of the benchmark system. For example: the second benchmark power measurement of the compute-heavy benchmark workload can be greater than a first percentage (e.g., 30 percent) of an overall power consumption of the benchmark system; the third benchmark power measurement of the memory-heavy benchmark workload can be greater than a second percentage (e.g., 25 percent) of the overall power consumption of the benchmark system; and the fourth benchmark power measurement of the I/O-heavy benchmark workload can be greater than a third percentage (e.g., 25 percent) of the overall power consumption of the benchmark system.

Server 112 can subsequently measure the power characteristics for a current workload on a computing device (operation 148) (e.g., on itself or on server 116 or 118). Similar to the benchmark power measurement, the server power measurements can be measured power characteristics of the server itself and of three sub-systems of the server, e.g.: 1) the server; 2) processing components of the server; 3) memory components of the server; and 4) I/O components of the server. Operations 140 and 148 may be performed by a baseboard management controller (BMC) associated with, respectively, the benchmark system and the computing device.

Server 112 can identify a benchmark workload (of the obtained benchmark workloads 146) which is most closely associated with the current workload (operation 150). This identification can be based on a ratio or comparison between two or more of the power characteristics measured for the current workload. For example, based on a first ratio between the second current power measurement (for the processing components) and the third current power measurement (for the memory components) exceeding a first predetermined value (e.g., 5/2), the system can identify the compute-heavy workload as the most closely associated benchmark workload with which the current workload is most closely associated. As another example, based on a second ratio between the third current power measurement (for the memory components) and the second current power measurement (for the processing components) exceeding a second predetermined value (e.g., 2/1), the system can identify the memory-heavy workload as the most closely associated benchmark workload. As yet another example, based on a third ratio between the fourth current power measurement (for the I/O components) and the second current power measurement (for the processing components) exceeding a third predetermined value (e.g., 3/2), the system can identify the I/O-heavy workload as the most closely associated benchmark workload. The first, second, and third predetermined values can be based on user-configured, default, or system-configured values.

As a result of operation 150, server 112 can determine the target efficiency threshold of the identified benchmark workload. Server 112 can adjust the current workload to meet the target efficiency threshold of the identified benchmark workload (operation 152). In some aspects, a virtual machine (VM) management system or a container management system (not shown) running on server 112 can migrate jobs to and from the server on which the current workload is being run, until the target efficiency threshold has been met.

During various stages of the operation of the entities in environment 100, including in response to user commands or requests, server 112 can return information 156 to device 102 (operation 154). Device 102 can receive information 156 (as information 158). Device 102 can display information 120 on peripheral I/O components 106. Displayed information 120 (as depicted in FIG. 1B) can include a visual representation of a benchmark workload of a benchmark system 121, which can include the following four power measurements: a first benchmark system power measurement 122; a second benchmark system processing components power measurement 123; a third benchmark system memory components power measurement 124; and a fourth benchmark system I/O components power measurement 125. Displayed information 120 can include a visual representation of a current workload of a computing device 126, which can include the following four power measurements: a first computing device power measurement 127; a second computing device processing components power measurement 128; a third computing device memory components power measurement 129; and a fourth computing device I/O components power measurement 130. Server 112 can also return information 156 (operation 154) which can be used to display elements 121-130.

Displayed information 120 can also include one or more interactive elements (not shown) which allow user 104 to send requests for workload information (e.g., a request workload information 166) or to execute a certain VM or container migration strategy (e.g., an execute migration strategy 170). In response to server 112 receiving request 166 (as a request 168) for workload information, server 112 can return information 156 (operation 154) indicating the requested workload information. Alternatively, if server 112 has not yet obtained the benchmark workloads, the current workload, and their respective corresponding power measurements, server 112 can retrieve that information (i.e., operations 140, 156, 142, 144, and 148) prior to returning information 156 (operation 154) to device 102, e.g., in response to request 108.

In response to server 112 receiving command 170 (as a command 172), server 112 can adjust the current workload to meet the target efficiency of the most closely associated benchmark workload (operation 152), by executing the migration strategy indicated in command 172. Commands 170 and 172 may be commands to execute a VM migration strategy (e.g., by migrating VMs to/from a server) or a container migration strategy (e.g., by migrating containers to/from a server). Server 112 can also return information 156 (operation 154) indicating completion of execution of the migration strategy and information associated with command 172 for executing the migration strategy.

Displayed information 120 can also include the identified benchmark workload most closely associated with the current workload (as returned subsequent to operations 150 and 154 and via information 156/158). Displayed information 120 can further include adjustment information 132, which can include virtual machine (VM) or container management strategy information 133 (as manipulated by user 104 and/or returned subsequent to commands 170/172 and operations 152/154 and via information 156/158).

Figure 2A:
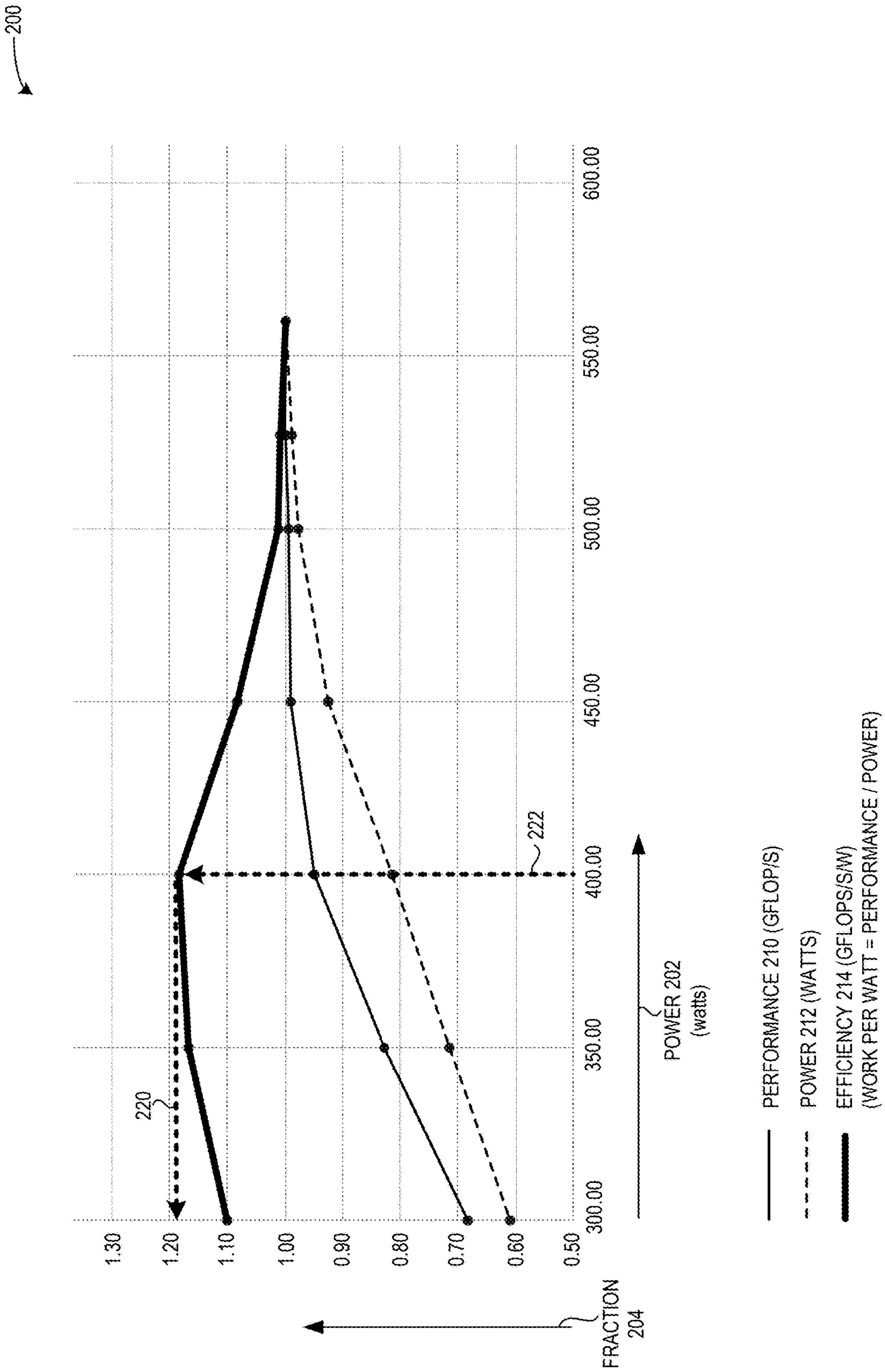
FIG. 2A presents a display screen for a user, including power measurements for a memory-heavy workload, in accordance with an aspect of the present application.

FIG. 2A presents a display screen 200 for a user, including power measurements for a memory-heavy workload, in accordance with an aspect of the present application. Display screen 200 (as well as display screen 230 of FIG. 2B) can include information which can be presented to an administrative user of an HPC system, as described above in relation to information 120 displayed on peripheral I/O components 106 for user 104 in FIG. 1A. Display screens 200 and 230 in, respectively, FIGS. 2A and 2B may be part of a graphical user interface (GUI) which provides interactive elements via which the user may manipulate or view data, or send requests or commands relating to optimizing energy efficiency of a workload based on power measurements and characteristics.

Display screen 200 can include information from a user dashboard, such as a diagram with an x-axis indicating power 202 (in watts) and a y-axis indicating a fraction 204 which represents performance over power, as normalized against a maximum operating point. For example, a y-axis value of "1.0" can correspond to the point at which the maximum power consumption occurs (i.e., the "maximum power draw"), which is set to 560 W for the data depicted in display screen 200.

The solid line can indicate the performance 210 (in gigaflops per second or "GFLOP/S") of the memory-heavy workload. The dashed line can indicate the average power 212 (in watts) consumed by a GPU in the node in order to execute the memory-heavy workload. The heavy solid line can indicate the energy efficiency 214 or usage of the memory-heavy workload (in gigaflops per second per watt or "GFLOP/S/W"), which can also be expressed as performance over power or "work per watt" (WPW). The measurements of GFLOPS/S and GFLOP/S/W are provided as illustrative examples only. Other units, measurements, or scales to indicate performance may be used. Based on the data as measured and depicted in display screen 200, given a maximum power draw of 560 W, the optimal efficiency point can be at 71% of the maximum power draw, i.e., at 400 W. Thus, in this example, the data displayed in FIG. 2A can indicate that 400 W (as noted by a heavy dashed line 222) is the most energy efficient point as the ratio of performance to power consumption (i.e., WPW) is the greatest (as indicated by a heavy dashed line 220).

The system can determine the optimal efficiency threshold based on what overall goal is to be achieved, e.g., energy efficiency or performance. Given the optimal efficiency point at 400 W (as indicated by 222), it can be observed that the optimal efficiency threshold may be for the system to be run at or below 400 W if energy efficiency is the goal (on the left side of line 222). Furthermore, if performance is the goal, the optimal efficiency threshold may be for the system to be run above 400 W (on the right side of line 222).

Figure 2B:
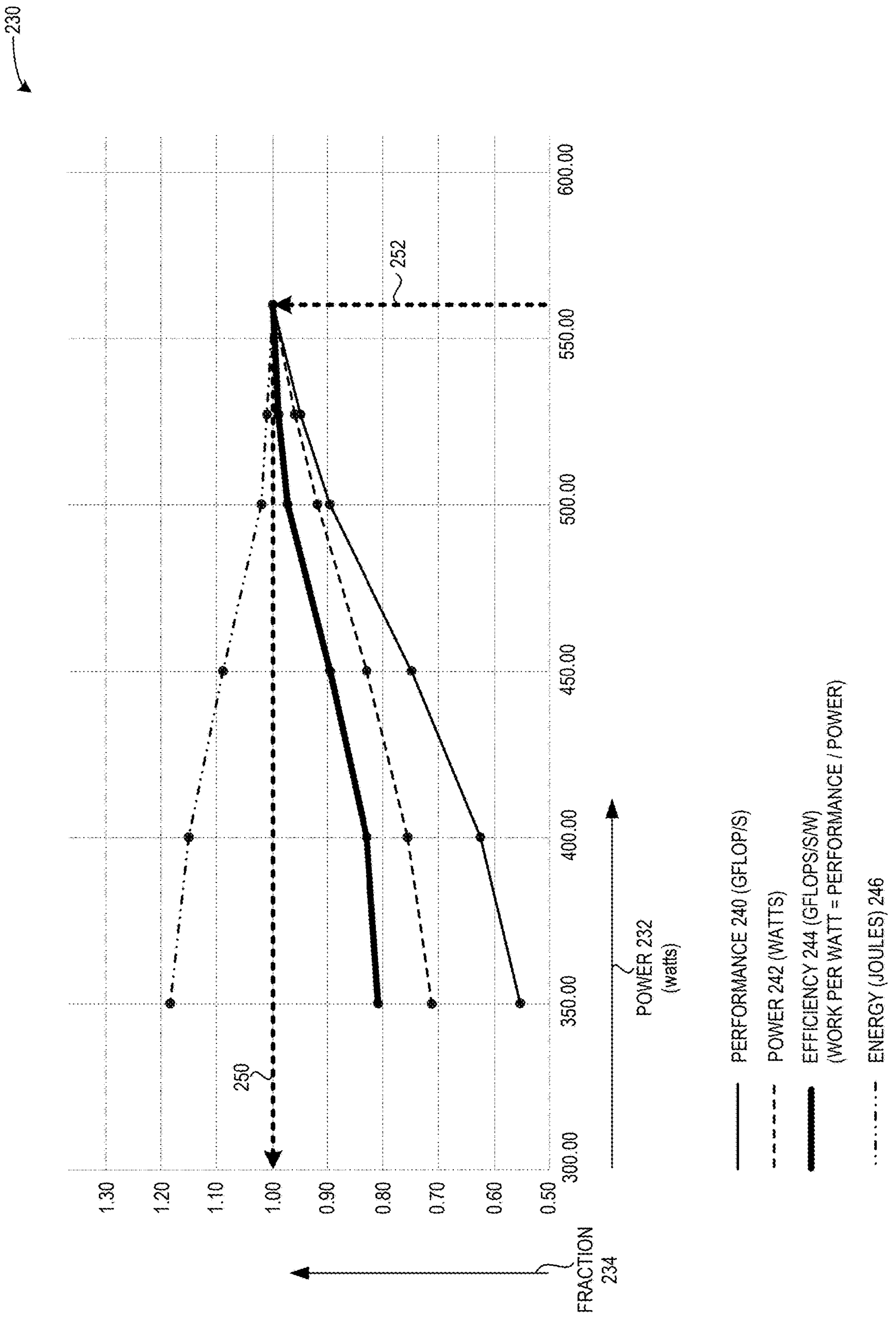
FIG. 2B presents a display screen for a user, including power measurements for a compute-heavy workload, in accordance with an aspect of the present application.

FIG. 2B presents a display screen 230 for a user, including power measurements for a compute-heavy workload, in accordance with an aspect of the present application. Display screen 230 can include information from a user dashboard, such as a diagram with an x-axis indicating power 232 (in watts) and a y-axis indicating a fraction 234 which represents performance over power, as normalized against a maximum operating point, similar to display screen 200.

The solid line can indicate the performance 240 (in GFLOP/S) of the compute-heavy workload. The dashed line can indicate the average power 242 (in watts) consumed by a GPU in the node in order to execute the compute-heavy workload. The heavy solid line can indicate the energy efficiency 244 or usage of the compute-heavy workload (in gigaflops per second per watt or "GFLOP/S/W," also expressed as performance over power or WPW). The dotted/dashed line can indicate the energy 246 (in joules) consumed in performing the compute-heavy workload. Note that in the memory-heavy workload depicted in FIG. 2A, the workload is performed on a fixed runtime, which results in energy measurement being the same as the power measurement (because energy is runtime*power). Thus, energy is not depicted separately in FIG. 2A. In contrast, in the compute-heavy workload depicted in FIG. 2B, the workload does not have a fixed runtime but does have a fixed problem size. As a result, plotting the energy and the power can result in separate curves on the graph depicted in FIG. 2B.

Based on the data as measured and depicted in display screen 230, given a maximum power draw of 560 W, energy consumption (indicated by 246) is the highest at 350 W and the lowest at 560 W. The optimal efficiency point can be indicated when efficiency 244 is at a value of 1.0 (as indicated by a heavy dashed line 250), which corresponds to when the system is at 100% of the maximum power draw, i.e., at 560 W (as indicated by a heavy dashed line 252). The system can determine the optimal efficiency threshold based on the overall goal to be achieved, e.g., energy efficiency or performance. In the compute-heavy workload of FIG. 2B, given the optimal efficiency point at 560 W (as indicated by 252), it can be observed that the optimal efficiency threshold may be for the system to be run at the maximum power draw of 560 W regardless of whether the goal is energy efficiency or performance, as both performance 240 and efficiency 244 decrease with a decrease in power (i.e., moving to the left of line 252).

The described aspects can also provide optimization of the energy efficiency of a server by using the power measurements and characteristics to determine whether a server is "idle" and can be shut down or placed in a "modern standby" (e.g., a "cold idle" mode which lies somewhere between a full shutdown and a standard idle mode). In current data centers, server utilization can generally be used to identify servers which should be placed in an idle state. However, observing the power drawn by servers (similar to operations 140 and 148 of FIG. 1C) may provide a more reliable manner by which to identify servers which should be placed in an idle state.

In general, servers may generate 25-30% of power consumption. Using the described aspects of measuring the power consumed by the entire system ("first power measurement") as well as by the specific processing, memory, and I/O components (respectively, "second power measurement," "third power measurement," and "fourth power measurement"), a user or the system can determine that the power used by the server is due solely (or mostly, based on a predetermined threshold) to the power measurements of the server itself, i.e., attributable to fan power, vent power, and other uses which are not specifically accounted for in the second, third, and fourth power measurements. When the power used by the server is determined to be all or mostly used by the server itself (and not the three sub-systems or components of the server), the system may set the server to an idle state. The server can migrate any VMs or containers still on that server to other servers. Efficiently identifying under-utilized servers, migrating VMs or containers as needed, and placing the identified servers in an idle or modern standby mode can result in further optimization of energy efficiency in the entire data center.

Figure 3A:
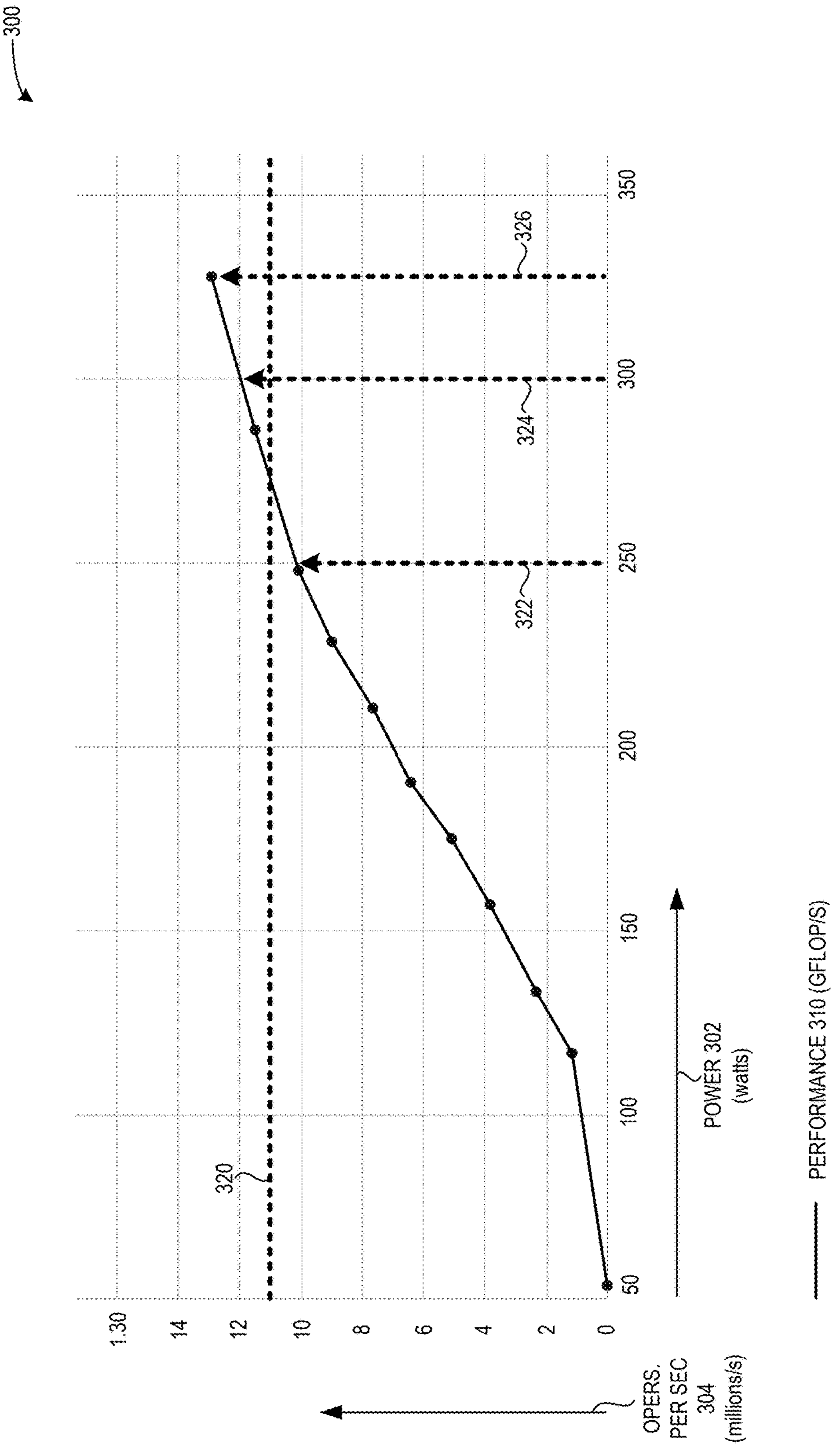
FIG. 3A presents a display screen for a user, including performance for an industry standard benchmark workload, in accordance with an aspect of the present application.

FIG. 3A presents a display screen 300 for a user, including performance for an industry standard benchmark workload, in accordance with an aspect of the present application. In display screens 300 and 330 of, respectively, FIGS. 3A and 3B, the industry standard benchmark workload can correspond to the workload of an entire server, e.g., a Lenovo Think System. Display screen 300 can include information from a user dashboard, such as a diagram with an x-axis indicating power 302 (in watts) and a y-axis indicating a number of operations per second 304 (in millions per second). The solid line can indicate the performance 310 (in GFLOP/S) of the workload depicted in FIG. 3A.

Display screen 300 indicates that a maximum performance of ~12.5 million instructions per second can be achieved at a power consumption of 325 W (as indicated by a heavy dashed line 326). At the same time, to achieve the $90^{th}$ percentile in performance of around ~11.25 (as indicated by a heavy dashed line 320), the system can be run at ~275 W. Display screen 300 also indicates that running the system at 250 W (as indicated by a heavy dashed line 322) can result in less than the $90^{th}$ percentile in performance being reached, while running it at 300 W (as indicated by a heavy dashed line 324) can result in greater than the $90^{th}$ percentile in performance being reached. The optimal performance (at ~325 W) is noted by a heavy dashed line 326.

Figure 3B:
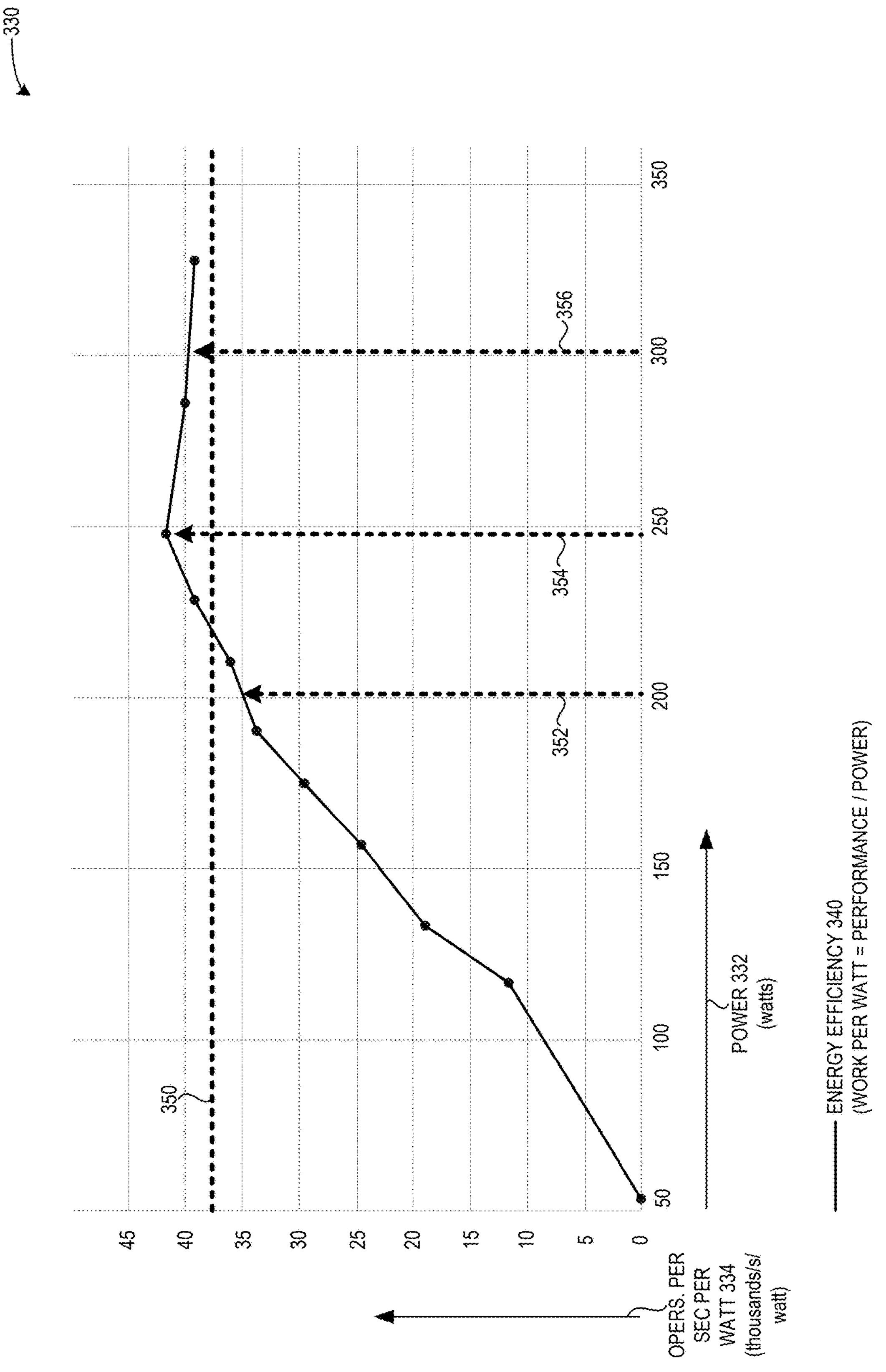
FIG. 3B presents a display screen for a user, including energy efficiency for an industry standard benchmark workload, in accordance with an aspect of the present application.

FIG. 3B presents a display screen 330 for a user, including energy efficiency for an industry standard benchmark workload, in accordance with an aspect of the present application. Display screen 330 can include information from a user dashboard, such as a diagram with an x-axis indicating power 332 (in watts) and a y-axis indicating a number of operations per second per watt 334 (in thousands/s/watt). The solid line can indicate the energy efficiency 340 (WPW) of the server workload depicted in FIG. 3B.

Display screen 330 indicates that a maximum energy efficiency of ~42K instructions per second can be achieved at a power consumption of ~248 W (as indicated by a heavy dashed line 354). At the same time, to achieve the $90^{th}$ percentile in energy efficiency of around ~37.8 (as indicated by a heavy dashed line 350), the system can be run at around 220 W. Display screen 330 also indicates that running the system at ~203 W (as indicated by a heavy dashed line 352) can result in less than the $90^{th}$ percentile in energy efficiency being reached, while running it at ~303 W (as indicated by a heavy dashed line 356) can result in greater than the $90^{th}$ percentile in performance being reached. The optimal energy efficiency (at ~248 W) is noted by a heavy dashed line 354.

Thus, a user or system can use the data depicted in FIGS. 3A and 3B to determine the optimal efficiency threshold for a system based on a prioritization of energy efficiency (WPW, as indicated by 354 in FIG. 3B), maximal performance (or time to solution, as indicated by 326 in FIG. 3A), or a defined energy to solution versus time to solution tradeoff.

The data presented in display screens 200 and 230 of, respectively, FIGS. 2A and 2B, are provided as illustrative examples only. Power measurements for a memory-heavy workload or a compute-heavy workload may differ from the data displayed in display screens 200 and 230. The data presented in display screens 300 and 330 of, respectively, FIGS. 3A and 3B are also provided as illustrative examples only. Performance data for other workloads, including other industry standard benchmark workloads or workloads obtained from customers or third parties, can also be used and presented as data similar to the data presented in display screens 300 and 330.

Figure 4:
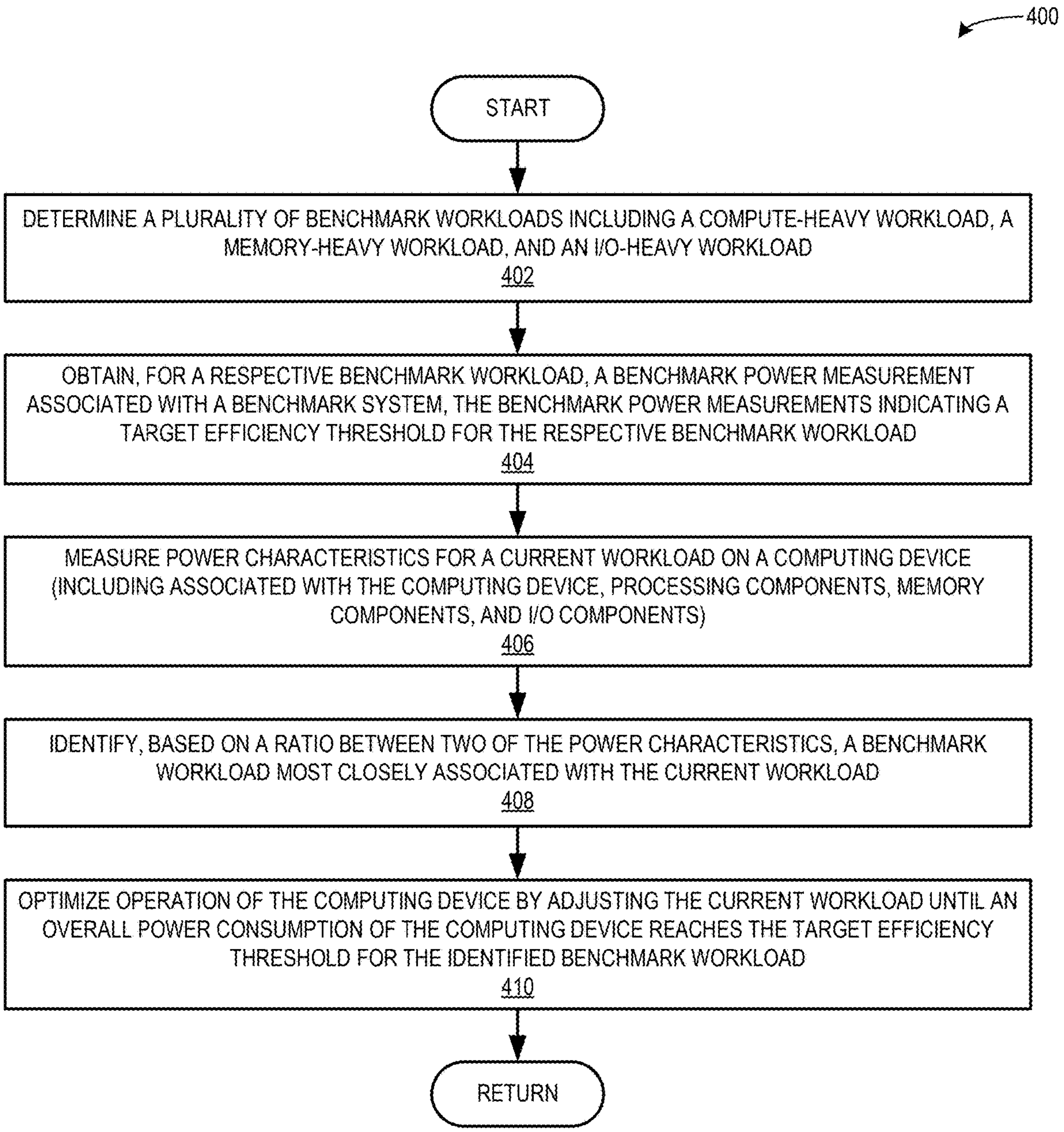
FIG. 4 presents a flowchart illustrating a method which facilitates optimizing energy efficiency of server load based on power measurements and characteristics, in accordance with an aspect of the present application.

FIG. 4 presents a flowchart 400 illustrating a method which facilitates optimizing energy efficiency of server load based on power measurements and characteristics, in accordance with an aspect of the present application. During operation, the system determines a plurality of benchmark workloads including a compute-heavy workload, a memory-heavy workload, and an input/output (I/O)-heavy workload (operation 402). The system may obtain the benchmark workloads based on, e.g., an industry-standard benchmark or training workload, a workload provided by a customer or user associated with a computing device, and a workload comprising a combination of compute-related jobs, memory-related jobs, and I/O-related jobs. The system may obtain any number of workloads to be used as a benchmark workload. In some aspects, the system may obtain up to a predetermined number of benchmark workloads. The system may also select only a certain number of benchmark workloads of each type, e.g., one compute-heavy workload, one memory-heavy workload, and one I/O-heavy workload. This number is provided for illustrative purposes only. The system can select (i.e., determine) any number of each type of benchmark workloads.

The system obtains, for a respective benchmark workload, a benchmark power measurement associated with a benchmark system, the benchmark power measurement indicating a target efficiency threshold for the respective benchmark workload (operation 404). The benchmark power measurement may include one or more of at least four different measures, including: a first benchmark power measurement associated with the benchmark system; a second benchmark power measurement associated with processing components of the benchmark system; a third benchmark power measurement associated with memory components of the benchmark system; and a fourth benchmark power measurement associated with I/O components of the benchmark system. The second, third, and fourth benchmark power measurements (i.e., associated with, respectively, the compute-heavy workload, the memory-heavy workload, and the I/O heavy workload) may be defined or determined to be associated with the respective benchmark workload based on the respective power measurement being greater than a predetermined percentage of the overall power consumption of the benchmark system. For example: the second benchmark power measurement of the compute-heavy benchmark workload can be greater than a first percentage (e.g., 40 percent) of an overall power consumption of the benchmark system; the third benchmark power measurement of the memory-heavy benchmark workload can be greater than a second percentage (e.g., 35 percent) of the overall power consumption of the benchmark system; and the fourth benchmark power measurement of the I/O-heavy benchmark workload can be greater than a third percentage (e.g., 25 percent) of the overall power consumption of the benchmark system.

The system measures power characteristics for a current workload on a computing device (operation 406). The power characteristics may comprise or include: a first current power measurement associated with the computing device; a second current power measurement associated with processing components of the computing device; a third current power measurement associated with memory components of the computing device; and a fourth current power measurement associated with I/O components of the computing device. The system may measure the power characteristics for any of the computing device, the processing components, the memory components, or the I/O components, using a baseboard management controller (BMC) associated with the system.

The system identifies, based on a ratio between two of the power characteristics, a benchmark workload most closely associated with the current workload (operation 408). As an example, the system can identify the benchmark workload further based on a first ratio between the second current power measurement (for the processing components) and the third current power measurement (for the memory components), and the system can determine, based on the first ratio exceeding a first predetermined value (e.g., a value indicating that the processing components power measurement would be significantly greater than the memory components power measurement), that the current workload is most closely associated with the compute-heavy workload. As an example, a user or the system may establish that a value of "5/2" (first predetermined value) indicates that the power used by the processing components for a given workload far exceeds the power used by the memory components, in which case a workload with a ratio greater than this established value may be determined to be associated with a processing-heavy or compute-heavy workload, while a workload with a ratio less than this established value would not be associated with a compute-heavy workload. In another example, the system can identify the benchmark workload further based on a second ratio between the third current power measurement (for the memory components) and the second current power measurement (for the processing components), and the system can determine, based on the second ratio exceeding a second predetermined value, that the current workload is most closely associated with the memory-heavy workload. In yet another example, the system can identify the benchmark workload further based on a third ratio between the fourth current power measurement (for the I/O components) and the second current power measurement (for the processing components), and the system can determine, based on the third ratio exceeding a third predetermined value, that the current workload is most closely associated with the I/O-heavy workload. The first, second, and third ratios can include a comparison of two or more power measurements, and the first, second, and third predetermined values can be based on user-configured, default, or system-configured values.

The system optimizes operation of the computing device by adjusting the current workload until an overall power consumption of the computing device reaches the target efficiency threshold for the identified benchmark workload (operation 410). The system may migrate jobs to or from the computing device in order to reach the target efficiency threshold for the identified benchmark workload. In some aspects, the system (e.g., based on preconfigured programming or based on a user sending a command to the system) may execute a virtual machine (VM) or container management strategy to perform job migration and thus adjust the current workload (as described above in relation to 170 and 172 of FIG. 1C). In some aspects, after the job migration is performed, the system may measure the power characteristics of the current workload to determine whether the job migration successfully results in the overall power consumption of the computing device reaching the target efficiency threshold for the identified benchmark workload. The system or a user may set a threshold or range (e.g., within a certain percentage such as 2% or 5%) within which the system may determine that the target efficiency threshold has been reached and send a notification to an entity executing the VM or container management strategy. The notification may cause the entity to cease an in-progress job migration. The system may also adjust the workload based on whether a workload is regularly scheduled. For example, the VM or container management strategy can create the job migration strategy based on whether a workload is a regularly scheduled workload, e.g., a workload which occurs repeatedly and periodically over a given period of time (such as once a week on Saturdays from 7:00-7:59 am), occurs once every weekday at a given time (such as every Monday, Tuesday, Wednesday, Thursday, and Friday at 2:05 am), etc.

The system can also display the result of the VM management strategy on a display screen for the user to view, analyze, and further manipulate, e.g., providing control to the user of the VM or container management strategy via one or more interactive elements on peripheral I/O components of a computing device associated with the user (as described above in relation to device 102, user 104, peripheral I/O components 106, and adjustment information 132 and VM or container management strategy information 133 in information 120 of FIG. 1B). The operation returns.

Figure 5:
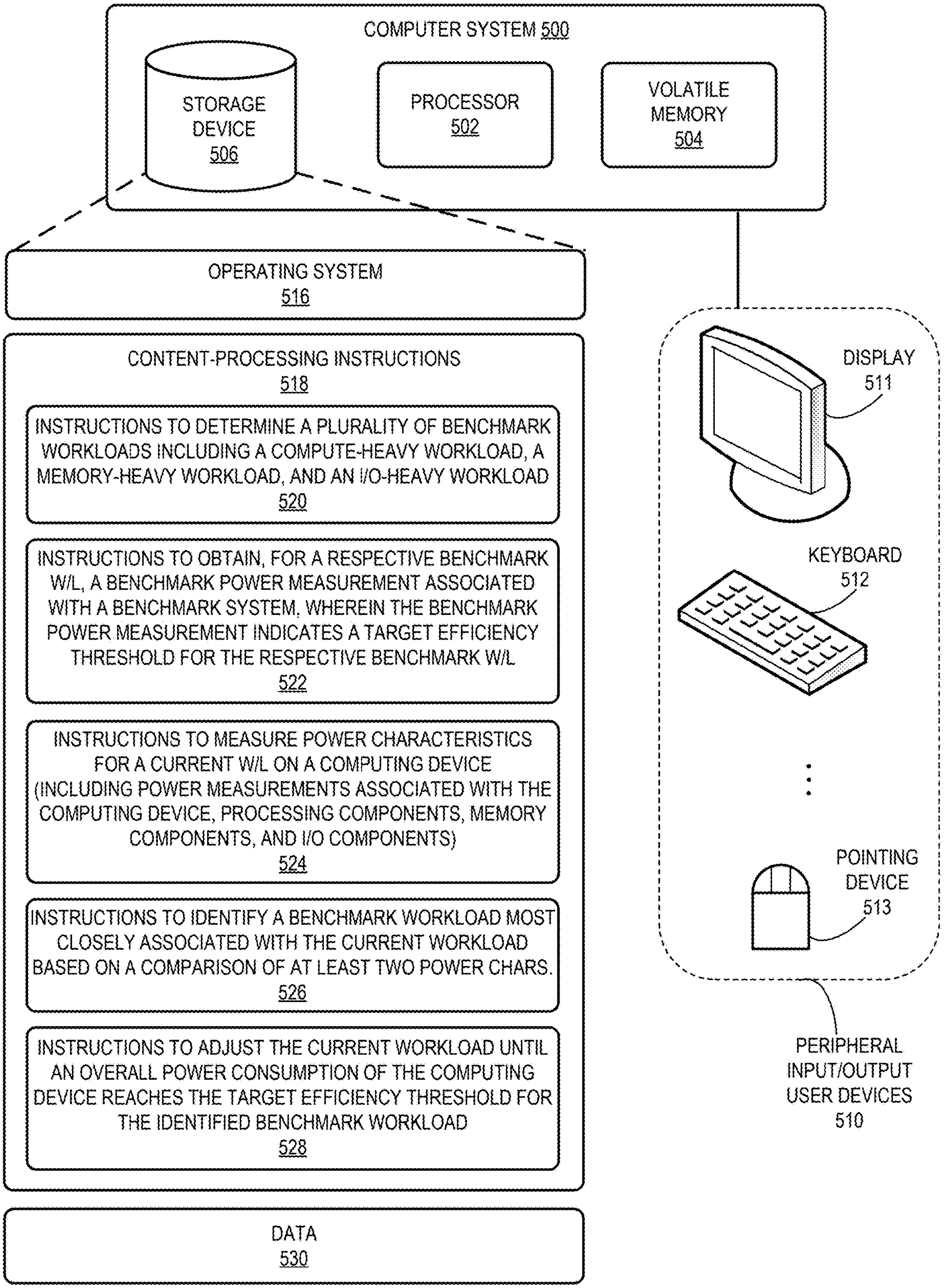
FIG. 5 illustrates a computer system which facilitates optimizing energy efficiency of server load based on power measurements and characteristics, in accordance with an aspect of the present application.

FIG. 5 illustrates a computer system 500 which facilitates optimizing energy efficiency of server load based on power measurements and characteristics, in accordance with an aspect of the present application. Computer system 500 includes a processor 502, a memory 504, and a storage device 506. Memory 504 may include a volatile memory (e.g., random access memory (RAM)) that serves as a managed memory and may be used to store one or more memory pools. Furthermore, computer system 500 may be coupled to peripheral input/output (I/O) user devices 510 (e.g., a display device 511, a keyboard 512, and a pointing device 513). Storage device 506 includes a non-transitory computer-readable storage medium and stores an operating system 516, content-processing instructions 518, and data 530. Computer system 500 can correspond to computing device or server 112 of FIG. 1A and may include fewer or more entities or instructions than those shown in FIG. 5. Content-processing instructions 518 may reside on a single computing device or may be spread across multiple physical and virtual machines communicating in a network environment.

Content-processing instructions 518 may include instructions 520-528, which when executed by computer system 500 (or by processor 502 of computer system 500) may cause computer system 500 to perform methods and/or processes described in this disclosure. Specifically, content-processing instructions 518 can include instructions 520 to determine a plurality of benchmark workloads including a compute-heavy workload, a memory-heavy workload, and an I/O-heavy workload, as described above in relation to operation 140 of FIG. 1C and operation 402 of FIG. 4. Content-processing instructions 518 can include instructions 522 to obtain, for a respective benchmark workload ("W/L"), a benchmark power measurement associated with a benchmark system, wherein the benchmark power measurement indicates a target efficiency threshold for the respective benchmark workload, as described above in relation to operation 140 of FIG. 1C and operation 404 of FIG. 4.

Content-processing instructions 518 can include instructions 524 to measure power characteristics for a current workload on a computing device. The power characteristics can include: a first current power measurement associated with the computing device; a second current power measurement associated with processing components of the computing device; a third current power measurement associated with memory components of the computing device; and a fourth current power measurement associated with I/O components of the computing device. Similar to the first, second, third, and fourth benchmark power measurements, these first, second, third, and fourth current power measurements can correspond, respectively, to the computing device, processing components, memory components, and I/O components. The instructions 522 to obtain the benchmark power measurements for the respective benchmark workload and the instructions 524 to measure the power characteristics for the current workload can be performed by a baseboard management controller (BMC) associated with computer system 500, as described above in relation to operations 140 and 148 of FIG. 1C.

Content-processing instructions 518 can include instructions 526 to identify a benchmark workload most closely associated with the current workload based on a comparison of at least two of the power characteristics. For example, as described above in relation to operation 408 of FIG. 4, the system can determine that: the current workload is most closely associated with the compute-heavy workload in response to a comparison of the second and third current power measurements resulting in a ratio which exceeds a first predetermined value; the current workload is most closely associated with the memory-heavy workload in response to a comparison of the third and second current power measurements resulting in a ratio which exceeds a second predetermined value; and the current workload is most closely associated with the I/O-heavy workload in response to a comparison of the fourth and second current power measurements resulting in a ratio which exceeds a third predetermined value.

In some aspects, the system can compare three of the power characteristics against another predetermined value to determine the most closely associated benchmark workload for the current workload. For example, the system can compare the second (processing components), third (memory components), and fourth (I/O components) current power measurements. The system can determine whether the second current power measurement comprises a greater percentage (e.g., 30%) of the overall power consumption than a sum (e.g., 10%+15%=25%) of the third and fourth power measurements. If so, the system can determine that the current workload is most closely associated with the compute-heavy workload.

Content-processing instructions 518 can also include instructions 528 to adjust the current workload until an overall power consumption of the computing device reaches the target efficiency threshold for the identified benchmark workload, as described above in relation to operation 152 of FIG. 1C and operation 410 of FIG. 4.

Data 530 may include any data that is required as input or that is generated as output by the methods, operations, communications, and/or processes described in this disclosure. Specifically, data 530 may store at least: a workload; a current workload; a benchmark workload; a compute-heavy workload; a memory-heavy workload; an I/O heavy workload; a power measurement; a benchmark power measurement; for a benchmark system, a first, second, third, or fourth power measurement associated with the benchmark system, processing components of the benchmark system, memory components of the benchmark system, or I/O components of the benchmark system; for a computing device, a first, second, third, or fourth current power measurement associated with the computing device, processing components of the computing device, memory components of the computing device, or I/O components of the computing device; a power characteristic; a target efficiency threshold; an optimal operating point or sweetspot for a system or a workload operating on a system; a percentage; an overall power consumption of a benchmark system; a ratio between two power characteristics or measurements; a comparison of two or more power characteristics or measurements; an indicator of a migration strategy, including jobs migrated to or from a computing device; an indicator of a prioritization of workload performance or energy efficiency; information related to obtaining benchmark workloads; a sum of the second, third, and fourth power measurements; a difference between the first power measurement and the sum; a determination of whether a computing device is to be set to an idle state; and one or more predetermined values or thresholds.

Content-processing instructions 518 may include more instructions than those shown in FIG. 5. For example, content-processing instructions 518 may also store instructions for executing the operations described above in relation to: the environment of FIG. 1A; the communications resulting in the graphs of FIGS. 2A and 2B; the operations depicted in flowchart 400 of FIG. 4; and the instructions of computer-readable medium 600 in FIG. 6.

Figure 6:
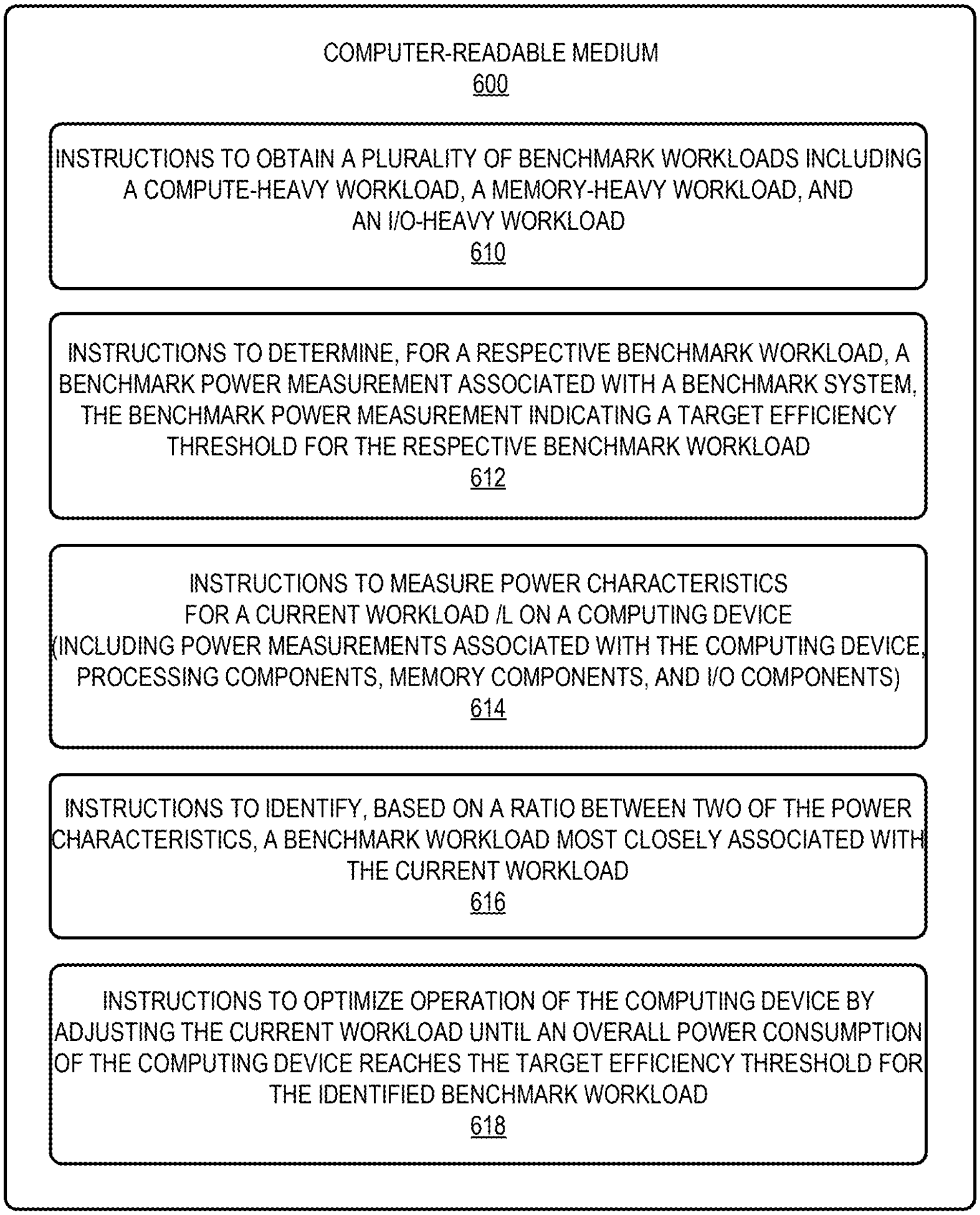
FIG. 6 illustrates a computer-readable medium which facilitates optimizing energy efficiency of server load based on power measurements and characteristics, in accordance with an aspect of the present application.

FIG. 6 illustrates a computer-readable medium (CRM) 600 which facilitates optimizing energy efficiency of server load based on power measurements and characteristics, in accordance with an aspect of the present application. CRM 600 may be a non-transitory computer-readable medium or device storing instructions that when executed by a computer or processor cause the computer or processor to perform a method. CRM 600 can store instructions 610 to obtain a plurality of benchmark workloads including a compute-heavy workload, a memory-heavy workload, and an input/output (I/O)-heavy workload, as described above in relation to operation 140 of FIG. 1C and operation 402 of FIG. 4. CRM 600 can store instructions 612 to determine, for a respective benchmark workload, a benchmark power measurement associated with a benchmark system, the benchmark power measurement indicating a target efficiency threshold for the respective benchmark workload, as described above in relation to operation 140 of FIG. 1C and operation 404 of FIG. 4.

CRM 600 can store instructions 614 to measure power characteristics for a current workload on a computing device, the power characteristics comprising: a first current power measurement associated with the computing device; a second current power measurement associated with processing components of the computing device; a third current power measurement associated with memory components of the computing device; and a fourth current power measurement associated with I/O components of the computing device. The instructions 612 to determine the benchmark power measurements for the respective benchmark workload and the instructions 614 to measure the power characteristics for the current workload can be performed by a baseboard management controller (BMC), as described above in relation to operations 140 and 148 of FIG. 1C.

CRM 600 can also store instructions 616 to identify, based on a ratio between two of the power characteristics, a benchmark workload most closely associated with the current workload, as described above in relation to instructions 526 of FIG. 5. CRM 600 can store instructions 618 to optimize operation of the computing device by adjusting the current workload until an overall power consumption of the computing device reaches the target efficiency threshold for the identified benchmark workload, as described above in relation to operation 152 of FIG. 1C, operation 410 of FIG. 4, and instructions 528 of FIG. 5.

CRM 600 may include more instructions than those shown in FIG. 6. For example, CRM 600 may also store instructions for executing the operations described above in relation to: the environment of FIG. 1A; the communications resulting in the graphs of FIGS. 2A and 2B; the operations depicted in flowchart 400 of FIG. 4; and content-processing instructions 518 in FIG. 5.

The terms “HPC system” and “HPC environment” are used interchangeably in this disclosure and refer to a computing environment which includes a plurality of “nodes” running a plurality of jobs which makeup a “workload.” A “node” can be a computing device, server, networked device, or computer system and can include a memory, one or more cores or processors, and one or more jobs which are to be executed or run by the one or more cores or processors. As used in this disclosure, a “computing device” (such as server 112 in FIG. 1A) can include at least: processing components which can perform compute-related jobs (e.g., processing by central processing units (CPUs), graphics processing units (GPUs), accelerators, etc.); memory components which can perform memory-related jobs (e.g., reading, writing, and deleting data in random access memory (RAM)); and I/O components which can perform I/O-related jobs (e.g., communications over a Peripheral Component Interconnect Express (PCIe) bus, network cards, etc.).

In general, the disclosed aspects provide a method, a computer system, and a computer-readable medium (CRM) which facilitate optimizing energy efficiency of server load based on power measurements and characteristics. During operation, the system determines a plurality of benchmark workloads including a compute-heavy workload, a memory-heavy workload, and an input/output (I/O)-heavy workload. The system obtains, for a respective benchmark workload, a benchmark power measurement associated with a benchmark system. The benchmark power measurement indicates a target efficiency threshold for the respective benchmark workload. The system measures power characteristics for a current workload on a computing device. The power characteristics comprise: a first current power measurement associated with the computing device; a second current power measurement associated with processing components of the computing device; a third current power measurement associated with memory components of the computing device; and a fourth current power measurement associated with I/O components of the computing device. The system identifies, based on a ratio between two of the power characteristics, a benchmark workload most closely associated with the current workload. The system optimizes operation of the computing device by adjusting the current workload until an overall power consumption of the computing device reaches the target efficiency threshold for the identified benchmark workload.

In a variation on this aspect, the benchmark power measurement comprises: a first benchmark power measurement associated with the benchmark system; a second benchmark power measurement associated with processing components of the benchmark system; a third benchmark power measurement associated with memory components of the benchmark system; and a fourth benchmark power measurement associated with I/O components of the benchmark system.

In a further variation, the second benchmark power measurement of the compute-heavy benchmark workload is greater than a first percentage of an overall power consumption of the benchmark system. The third benchmark power measurement of the memory-heavy benchmark workload is greater than a second percentage of the overall power consumption of the benchmark system. The fourth benchmark power measurement of the I/O-heavy benchmark workload is greater than a third percentage of the overall power consumption of the benchmark system.

In a further variation, identifying the benchmark workload is further based on a first ratio between the second current power measurement and the third current power measurement. The system determines, based on the first ratio exceeding a first predetermined value, that the current workload is most closely associated with the compute-heavy workload.

In a further variation, identifying the benchmark workload is further based on a second ratio between the third current power measurement and the second current power measurement. The system determines, based on the second ratio exceeding a second predetermined value, that the current workload is most closely associated with the memory-heavy workload.

In a further variation, identifying the benchmark workload is further based on a third ratio between the fourth current power measurement and the second current power measurement. The system determines, based on the third ratio exceeding a third predetermined value, that the current workload is most closely associated with the I/O-heavy workload.

In a further variation, the optimal efficiency threshold is based on a prioritization of at least one of: performance of the workload; or energy efficiency of the workload measured as a ratio of performance to an amount of power consumed for the workload.

In a further variation, adjusting the current workload comprises at least one of: migrating jobs to the computing device; migrating jobs from the computing device; executing a VM management strategy; or executing a container management strategy.

In a further variation, the system obtains the plurality of benchmark workloads based on at least one of: an industry-standard benchmark or training workload; a workload provided by a customer or user associated with the computing device; or a workload comprising a combination of compute-related jobs, memory-related jobs, and I/O-related jobs.

In a further variation, the system calculates a sum of the second, third, and fourth current power measurements. The system determines a difference between the first current power measurement and the sum. The system sets the computing device to an idle state responsive to the sum being less than a first predetermined value and the difference being greater than a second predetermined value. The system powers off computing devices set to the idle state based on a policy for energy efficiency.

In a further variation, obtaining the benchmark power measurement for the respective benchmark workload and measuring the power characteristics for the current workload are performed by a baseboard management controller associated with the computing device.

In another aspect, a computer system comprises a processor and a storage device storing instructions which when executed by the processor comprise instructions to perform operations. The instructions are to determine a plurality of benchmark workloads including a compute-heavy workload, a memory-heavy workload, and an input/output (I/O)-heavy workload. The instructions are further to obtain, for a respective benchmark workload, a benchmark power measurement associated with a benchmark system, wherein the benchmark power measurement indicates a target efficiency threshold for the respective benchmark workload. The instructions are further to measure power characteristics for a current workload on a computing device, the power characteristics comprising: a first current power measurement associated with the computing device; a second current power measurement associated with processing components of the computing device; a third current power measurement associated with memory components of the computing device; and a fourth current power measurement associated with I/O components of the computing device. The instructions are further to identify a benchmark workload most closely associated with the current workload based on a comparison of at least two of the power characteristics. The instructions are further to adjust the current workload until an overall power consumption of the computing device reaches the target efficiency threshold for the identified benchmark workload. The computer system may include content-processing instructions which include more instructions, e.g., the instructions to perform the operations described herein, including in relation to: the environment of FIG. 1A; the communications resulting in the graphs of FIGS. 2A and 2B; the operations depicted in flowchart 400 of FIG. 4; and the instructions of computer-readable medium 600 in FIG. 6.

In yet another aspect, a non-transitory computer-readable storage medium (CRM) stores instructions to obtain a plurality of benchmark workloads including a compute-heavy workload, a memory-heavy workload, and an input/output (I/O)-heavy workload. The instructions are further to determine, for a respective benchmark workload, a benchmark power measurement associated with a benchmark system, the benchmark power measurement indicating a target efficiency threshold for the respective benchmark workload. The instructions are further to measure power characteristics for a current workload on a computing device, the power characteristics comprising: a first current power measurement associated with the computing device; a second current power measurement associated with processing components of the computing device; a third current power measurement associated with memory components of the computing device; and a fourth current power measurement associated with I/O components of the computing device. The instructions are further to identify, based on a ratio between two of the power characteristics, a benchmark workload most closely associated with the current workload. The instructions are further to optimize operation of the computing device by adjusting the current workload until an overall power consumption of the computing device reaches the target efficiency threshold for the identified benchmark workload. The CRM may also store instructions for executing the operations described above in relation to: the environment of FIG. 1A; the communications resulting in the graphs of FIGS. 2A and 2B; the operations depicted in flowchart 400 of FIG. 4; and content-processing instructions 518 in FIG. 5.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:

determining a plurality of benchmark workloads including a compute-heavy workload, a memory-heavy workload, and an input/output (I/O)-heavy workload;

obtaining, for a respective benchmark workload, a benchmark power measurement associated with a benchmark system, the benchmark power measurement indicating a target efficiency threshold for the respective benchmark workload;

measuring power characteristics for a current workload on a computing device, the power characteristics comprising:

a first current power measurement associated with the computing device;

a second current power measurement associated with processing components of the computing device;

a third current power measurement associated with memory components of the computing device; and a fourth current power measurement associated with I/O components of the computing device;

computing a plurality of ratios, each ratio of the plurality of ratios being computed between a pair of the first, second, third, or fourth current power measurements;

identifying, as a benchmark workload with which the current workload is associated, one of the compute-heavy workload, the memory-heavy workload, or the I/O-heavy workload, wherein identifying the benchmark workload comprises comparing the plurality of computed ratios to a plurality of corresponding predetermined values; and optimizing operation of the computing device by adjusting the current workload until an overall power consumption of the computing device reaches the target efficiency threshold for the identified benchmark workload.

2. The method of claim 1, wherein the benchmark power measurement comprises:

a first benchmark power measurement associated with the benchmark system;

a second benchmark power measurement associated with processing components of the benchmark system;

a third benchmark power measurement associated with memory components of the benchmark system; and a fourth benchmark power measurement associated with I/O components of the benchmark system.

3. The method of claim 2, wherein the second benchmark power measurement of the compute-heavy benchmark workload is greater than a first percentage of an overall power consumption of the benchmark system, wherein the third benchmark power measurement of the memory-heavy benchmark workload is greater than a second percentage of the overall power consumption of the benchmark system, and wherein the fourth benchmark power measurement of the I/O-heavy benchmark workload is greater than a third percentage of the overall power consumption of the benchmark system.

4. The method of claim 1, wherein identifying the benchmark workload is further based on the plurality of ratios comprising a first ratio between the second current power measurement and the third current power measurement; and wherein the method further comprises determining, based on the first ratio exceeding a first predetermined value, that the current workload is most closely associated with the compute-heavy workload.

5. The method of claim 1, wherein identifying the benchmark workload is further based on the plurality of ratios comprising a second ratio between the third current power measurement and the second current power measurement; and wherein the method further comprises determining, based on the second ratio exceeding a second predetermined value, that the current workload is most closely associated with the memory-heavy workload.

6. The method of claim 1, wherein identifying the benchmark workload is further based on the plurality of ratios comprising a third ratio between the fourth current power measurement and the second current power measurement; and wherein the method further comprises determining, based on the third ratio exceeding a third predetermined value, that the current workload is most closely associated with the I/O-heavy workload.

7. The method of claim 1, wherein the optimal efficiency threshold is based on a prioritization of at least one of:

performance of the workload; or energy efficiency of the workload measured as a ratio of performance to an amount of power consumed for the workload.

8. The method of claim 1, wherein adjusting the current workload comprises at least one of:

migrating jobs to the computing device;

migrating jobs from the computing device;

executing a virtual machine (VM) management strategy; or executing a container management strategy.

9. The method of claim 1, further comprising:

obtaining the plurality of benchmark workloads based on at least one of:

an industry-standard benchmark or training workload;

a workload provided by a customer or user associated with the computing device; or a workload comprising a combination of compute-related jobs, memory-related jobs, and I/O-related jobs.

10. The method of claim 1, further comprising:

calculating a sum of the second, third, and fourth current power measurements;

determining a difference between the first current power measurement and the sum;

setting the computing device to an idle state responsive to the sum being less than a first predetermined value and the difference being greater than a second predetermined value; and powering off computing devices set to the idle state based on a policy for energy efficiency.

11. The method of claim 1, wherein obtaining the benchmark power measurement for the respective benchmark workload and measuring the power characteristics for the current workload are performed by a baseboard management controller associated with the computing device.

12. A computer system comprising:

a processor; and a storage device storing instructions which when executed by the processor comprise instructions to:

determine a plurality of benchmark workloads including a compute-heavy workload, a memory-heavy workload, and an input/output (I/O)-heavy workload;

obtain, for a respective benchmark workload, a benchmark power measurement associated with a benchmark system, wherein the benchmark power measurement indicates a target efficiency threshold for the respective benchmark workload;

measure power characteristics for a current workload on a computing device, the power characteristics comprising:

a first current power measurement associated with the computing device;

a second current power measurement associated with processing components of the computing device;

a third current power measurement associated with memory components of the computing device; and a fourth current power measurement associated with I/O components of the computing device;

compute a plurality of ratios, each ratio of the plurality of ratios being computed between a pair of the first, second, third, or fourth current power measurements;

identify, as a benchmark workload with which the current workload is associated, one of the compute-heavy workload, the memory-heavy workload, or the I/O-heavy workload, wherein identifying the benchmark workload comprises comparing the plurality of computed ratios to a plurality of corresponding predetermined values; and adjust the current workload until an overall power consumption of the computing device reaches the target efficiency threshold for the identified benchmark workload.

13. The computer system of claim 12, wherein the benchmark power measurement comprises:

a first benchmark power measurement associated with the benchmark system;

a second benchmark power measurement associated with processing components of the benchmark system;

a third benchmark power measurement associated with memory components of the benchmark system; and a fourth benchmark power measurement associated with I/O components of the benchmark system.

14. The computer system of claim 13, wherein the second benchmark power measurement of the compute-heavy benchmark workload is greater than a first percentage of an overall power consumption of the benchmark system, wherein the third benchmark power measurement of the memory-heavy benchmark workload is greater than a second percentage of the overall power consumption of the benchmark system, and wherein the fourth benchmark power measurement of the I/O-heavy benchmark workload is greater than a third percentage of the overall power consumption of the benchmark system.

15. The computer system of claim 12, the instructions further to:

determine that the current workload is associated with the compute-heavy workload in response to a comparison of the second and third current power measurements resulting in a computed ratio which exceeds a first predetermined value;

determine that the current workload is associated with the memory-heavy workload in response to a comparison of the third and second current power measurements resulting in a computed ratio which exceeds a second predetermined value; and determine that the current workload is associated with the I/O-heavy workload in response to a comparison of the fourth and second current power measurements resulting in a computed ratio which exceeds a third predetermined value.

16. The computer system of claim 12, wherein the optimal efficiency threshold is based on a prioritization of at least one of:

performance of the workload; or energy efficiency of the workload measured as a ratio of performance to an amount of power consumed for the workload.

17. The computer system of claim 12, the instructions to optimize operation of the computing device by adjusting the current workload further to perform at least one of:

migrating jobs to the computing device;

migrating jobs from the computing device;

executing a virtual machine (VM) management strategy; or executing a container management strategy.

18. The computer system of claim 12, the instructions further to:

obtain the plurality of benchmark workloads based on at least one of:

an industry-standard benchmark or training workload;

a workload provided by a customer or user associated with the computing device; or a workload comprising a combination of compute-related jobs, memory-related jobs, and I/O-related jobs.

19. The computer system of claim 12, the instructions further to:

calculate a sum of the second, third, and fourth current power measurements;

determine a difference between the first current power measurement and the sum;

set the computing device to an idle state responsive to the sum being less than a first predetermined value and the difference being greater than a second predetermined value; and power off computing devices set to the idle state based on a policy for energy efficiency.

20. A non-transitory computer-readable medium storing instructions to:

obtain a plurality of benchmark workloads including a compute-heavy workload, a memory-heavy workload, and an input/output (I/O)-heavy workload;

determine, for a respective benchmark workload, a benchmark power measurement associated with a benchmark system, the benchmark power measurement indicating a target efficiency threshold for the respective benchmark workload;

measure power characteristics for a current workload on a computing device, the power characteristics comprising:

a first current power measurement associated with the computing device;

a second current power measurement associated with processing components of the computing device;

a third current power measurement associated with memory components of the computing device; and a fourth current power measurement associated with I/O components of the computing device;

compute a plurality of ratios, each ratio of the plurality of ratios being computed between a pair of the first, second, third, or fourth current power measurements;

identify, as a benchmark workload with which the current workload is associated, one of the compute-heavy workload, the memory-heavy workload, or the I/O-heavy workload, wherein identifying the benchmark workload comprises comparing the plurality of computed ratios to a plurality of corresponding predetermined values; and optimize operation of the computing device by adjusting the current workload until an overall power consumption of the computing device reaches the target efficiency threshold for the identified benchmark workload.

* * * * *